Feb. 3, 1959　　　　J. C. HOBBS　　　2,872,545
REMOTE CONTROLLED SWITCHING DEVICE
Filed Jan. 26, 1954　　　　　　　　　4 Sheets-Sheet 1

Fig. 1

INVENTOR.
JAMES C. HOBBS
BY
RICHEY, WATTS, EDGERTON & McNENNY
A.D. Watts
ATTORNEYS Feb. 3, 1959  J. C. HOBBS  2,872,545
REMOTE CONTROLLED SWITCHING DEVICE
Filed Jan. 26, 1954  4 Sheets-Sheet 2

INVENTOR.
JAMES C. HOBBS
BY
RICHEY, WATTS, EDGERTON & McNENNY
B.D. Watts
ATTORNEYS Feb. 3, 1959

J. C. HOBBS

2,872,545

REMOTE CONTROLLED SWITCHING DEVICE

Filed Jan. 26, 1954

INVENTOR.
JAMES C. HOBBS
BY
RICHEY, WATTS, EDGERTON & McNENNY

B. D. Watts
ATTORNEYS

United States Patent Office 2,872,545
Patented Feb. 3, 1959

2,872,545

REMOTE CONTROLLED SWITCHING DEVICE

James C. Hobbs, Coral Gables, Fla., assignor of an undivided interest to the United States of America as represented by the United States Atomic Energy Commission Application January 26, 1954, Serial No. 406,294

28 Claims. (Cl. 200—92)

This invention relates generally to the art of electric switching and is more particularly concerned with new switching apparatus which may be enclosed in a sealed container, may be adjusted while so enclosed and may be remotely controlled. For various uses, a switching device is desirable which can be remotely controlled and in which one or more switches may be accurately operated at predetermined times or with predetermined intervening time intervals. Devices proposed heretofore for such uses have been extremely complicated, have consisted of a multitude of parts and have not been satisfactory from the standpoint of certainty of operation or of maintenance of adjustment.

The present invention satisfies the requirements of such uses by providing a new combination and arrangement of elements which produces new results by the conjoint operation of the elements. This new combination consists of a minimum number of elements which are of such shape and construction as to involve low manufacturing and assembling costs and the complete device is sturdy and quite resistant to factors which might tend to make its operation uncertain or to change some of its adjustments.

The present invention will be better understood by those skilled in the art from the following detailed description and the drawings which accompany and form a part of this specification and in which.

The device shown in the drawings comprises a container and a plurality of parts supported within the container.

The container consists of a cylindrical, cup-shaped sheet metal shell or can having a cylindrical side wall 1, a closed end wall 2, and an open end defined by a conical end projection 3 of the side wall 1; and a cover or closure 4 having a disk-like body 5 and an outwardly extending conical, peripheral flange 6. The inner conical surfaces of projection 3 and flange 6 are dimensioned to have close fitting engagement with each other when the closure is in place on the can. The cover is preferably attached to the can by a thin film of solder 7 which is substantially co-extensive with the opposed parts of the conical surfaces and seals them against the passage of fluid therebetween. This film may be formed by differentially heating the walls 3 and 6 while solder is in contact with wall 6 at the end of wall 3 with resultant flow of the molten solder into the space between the conical surfaces by capillary action.

The body portion 5 of cover 4 has an outwardly extending projection 8 which forms an internal socket, for a purpose presently to appear, and is also provided with an outwardly extending projection 10 which is cut away so as to form an opening 11, a glass window 12 is secured in the projection as by being connected thereto by solder 13, the window 12 exposing to view certain of the parts of the device within the can. The body portion 5 is also provided with two outwardly extending projections 15, each of which is cut away at its outer end to receive a header which consists of a metal ring 16 and an insulator disk 16a provided with a plurality of electrical contacts 17 extending therethrough. Rings 16 have close fitting engagement with projections 15 and are attached to cover 4 by a thin film of solder after the manner above described in connection with sealing the cover to the can.

On the inner side of cover 4 are mounted two inwardly projecting stops 20 and 20a which serve to support an index marker 25 on the inner side of cover 4 and also a detent spring or dog 27. The purpose of the stops 20, index marker 26 and dog 27 will presently appear.

A plurality of circumferentially spaced posts 30 are attached at their outer ends to cover 4 and at their inner ends are connected to a disk-shaped deck 31 which has an outside diameter only slightly less than the inside diameter of can 1 and which is composed of nonmagnetic material. When the side wall of the can 1 adjacent to deck 31 is deformed slightly, the deck 31 may be clamped in position in the container and a considerable portion of the weight of the parts attached to the deck will then be borne by the side wall of the container rather than by the cover 4, and relative movement of the deck and can will be prevented.

A constant speed motor 32 is connected against the inner side of deck 31 and has its rotor shaft 33 projecting through deck 31 and carrying a gear 34 on the outer side of the deck. This gear 34 serves to transmit rotary motion of the motor 33 to a train of gears including gears 35, 36, 37, 38, 39 and 40. These several gears are mounted on nonrotating shafts projecting outwardly from deck 31 at right angles thereto.

A manually rotatable post 45 is positioned at right angles to the outer surface of deck 31 with its inner end extending into an opening in deck 31 and its outer end projecting out through the socket in projection 8 of cover 4 and has a screwdriver-receiving slot 46 at its exposed outer end. Inward movement of post 45 is prevented by engagement of a shoulder 47 thereon with an abutment, the latter consisting of a sleeve 48 which bears against deck 31 and the inner bearing race 49 which engages the sleeve at one end and shoulder 47 at the other end. Adjacent to the inner side of cover 4, post 45 has a collar 50 secured thereto, as by pin 50a. The outer end of collar 50 is recessed to receive a spring 51 coiled around post 45.

A washer 51a is interposed between spring 51 and a plurality of O-rings 52 which surround post 45 in the socket in projection 8. Spring 51 acts to urge post 45 inwardly against the abutment and to urge the packing 52 outwardly. With this arrangement of parts it has been found that the O-rings which are preferably composed of resilient material, such as neoprene or rubber, will effectively seal the opening in cover 4 around post 45 against passage of fluid therethrough.

Collar 50 has secured thereto near its inner end a dial disk 55 having a notched periphery 56 and carrying upon its top surface a graduated scale or dial which may be viewed through window 12 and which has markings thereon adjacent to index 25. Pins 58 and 58a project outwardly through disk 55 and are positioned to engage stops 20 and 20a on opposite sides thereof to limit the extent of rotation of disk 55.

A spool 65 surrounds post 45 and is provided with a ball bearing which comprises the inner race 49 and an outer race 66. Spool 65 has a flange 68 near its inner end provided with peripheral gear teeth 69 to mesh with the teeth on gear 40 and be rotated thereby. At its outer end and adjacent to the inner end of collar 48, spool 65 is provided with a nut 70 and two keyways 71. A cam assembly is rotatably mounted on spool 65. This cam assembly comprises a hub 75 having a bearing fit on the spool, an inner cam disk 76 secured to the hub near its inner end and an outer cam disk 77 secured to the hub near its outer end. The inner cam disk 76 is provided with inwardly projecting pins 78 and 78a and has a cam-shaped periphery 79. Similarly the peripheral edge of disk 77 is provided with a cam surface 80. The purpose of these pins and cam surface will presently appear.

A friction clutch serves to connect the cam assembly with spool 65 for the transmission of rotational movement of the spool to the cams. This clutch may comprise fabric liners 85, preferably composed of nylon, interposed between disk 76 and an opposed annular surface of spool 65 and between disk 77 and a clutch plate 86, and spring means in the form of a dished plate 87 having a plurality of radially extended flexible fingers which bear at their outer ends against the outer surface of clutch plate 86 and are urged thereagainst by nut 70 on spool 65. Fingers 88 on the spring 87 and plate 86 project into keyways 71 and thereby connect these parts non-rotatably to spool 65.

Figures 3, 3A:
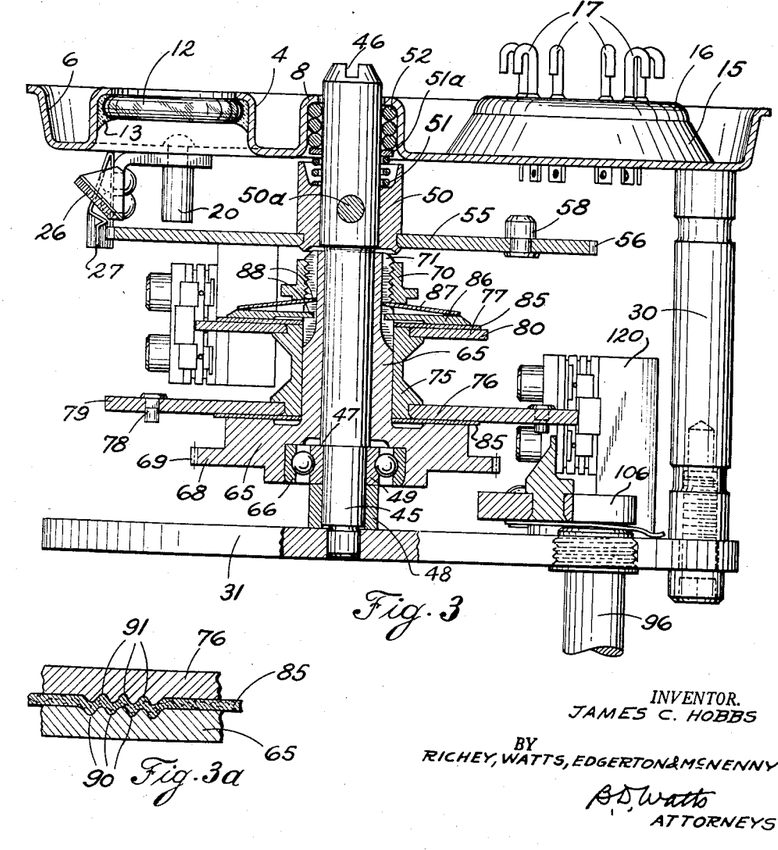
Figure 3 is an enlarged, longitudinal, sectional view, partly in elevation, of certain of the parts shown in Figure 1.
Figure 3a is an enlarged fragmentary section view showing in enlarged scale modified parts of the friction clutch.

While sufficient friction for most purposes may be obtained when the clutch liners 85 are frictionally engaged by opposing plane surfaces, greater driving force can be obtained, or less spring pressure need be applied, if the surfaces of spool 65 and cam 66 which engage liner 85 are provided with concentric, nesting grooves as is better shown in Figure 3a where 90 designates grooves of concentric corrugations on the outer surface of spool 65 which engages a clutch liner 86 and 91 designates the corresponding inter-fitting grooves of cam 76. These grooves also serve to dampen relative lateral movement of the spool and cam assembly.

An electromagnet, comprising two windings 95 and a U-shaped core, is mounted on the inner side of deck 31. This core conveniently consists of rods 96 (Fig. 3) extending axially through windings 95, threaded in holes in, and projecting through, deck 31. Near their inner ends, rods 96 are magnetically connected together by the tie bar 97. Preferably insulating disks 98, composed of nylon for example, are placed against the ends of the windings 95.

Conductors from the motor 32 and from the windings of the electromagnet are lead through one or more notches in the edge of deck 31 and are connected to the inner ends of terminals 17 adjacent to the inner side of cam cover 4.

Figure 1:
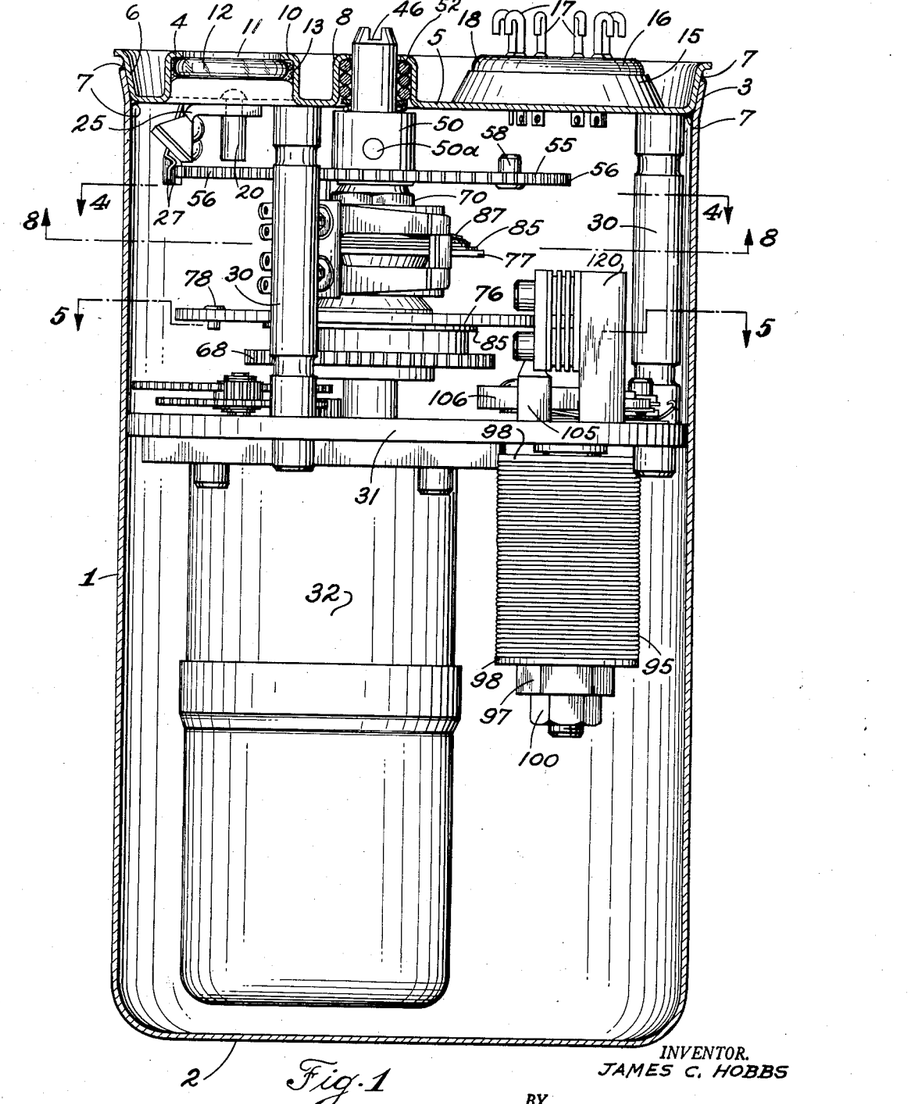
Figure 1 is a side view of a device embodying the present invention in which certain parts are shown in section and other parts are shown in elevation.
Figure 2:
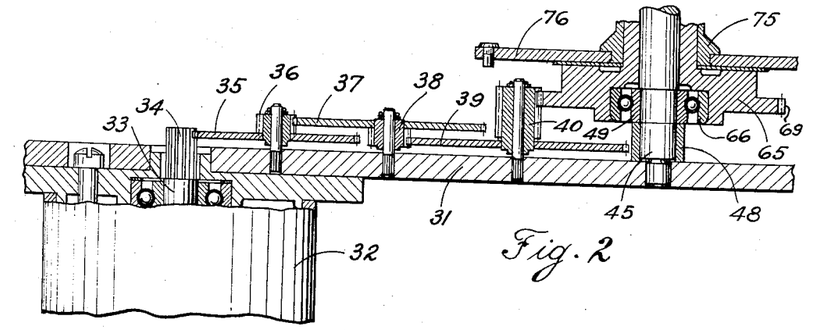
Figure 2 is an enlarged, sectional, partly diagrammatic view showing the train of gears and associated parts of Figure 1.

Two posts 105 (Figs. 4 to 8) are secured to the outer side of deck 31 and an armature 106 is disposed between these posts with its two laterally projecting arms 107 lying adjacent to the ends of core rods 96. This armature has drilled holes in its opposite edges and is pivotally supported on shafts 108 and 108a which project into and have loose fitting engagement with those drilled holes and have rounded inner ends engaging the conical ends of the holes. Preferably shaft 108a extends through its post and is secured to the armature after assembly therewith. A sleeve 109 on shaft 108a permits limited lateral play of the armature between posts 105. The armature 106 has a spring 110 fastened to its inner surface and bearing on the outer surface of deck 31. It is to be understood that when the electromagnet is energized, the arms 107 of the armature will be attracted toward the ends of rods 96 with resultant pivoting of the armature on its shafts 108 and 108a to one end of its stroke and coincident flexing of spring 110; and that when the electromagnet is de-energized, spring 110 will pivot armature 106 to the other end of its stroke. Figs. 1, 4 and 7 show the armature in the position it occupies when the electromagnet is energized and Figs. 5 and 6 show the position the armature occupies when the electromagnet is de-energized.

A latch arm 115 projects outwardly from the outer side of armature 106. As shown, this arm is a rod tapering outwardly, as at 116, and has a finger 117 projecting from its free end. The pin engaging side of finger 117 lies substantially in a plane through the center of the post 45 and the end surface of the arm adjacent to the finger is cut away to clear the end of the pins 78 and 78a. Cam 76 has two pins 78 and 78a pressed into and extending therethrough and positioned to engage the latch arm in its two extreme positions. As shown more clearly in Figures 4 and 5, pin 78 is mounted at a slightly shorter radial distance from the center of post 45 than is pin 78a. Pin 78 is so positioned that it will engage the finger 117 when the electromagnet is de-energized and while so engaged will prevent rotation of the disk 76 and the remaining parts of the cam assembly. If the motor 32 is energized during the time that pin 78 is engaging finger 117, the train of gears will rotate spool 65 but the friction clutch will slip and permit the cam assembly to stand still. When the electromagnet is energized and the armature is pivoted with resultant movement of the latch arm 115 out of stopping engagement with pin 78 and the motor is energized, the cam assembly will rotate with spool 65 until pin 78a comes into contact with finger 117. Thereupon the cam assembly comes to rest while the spool may continue to rotate. This condition is illustrated in Figs. 1, 3, 4 and 7. When the electromagnet is de-energized, the armature 106 is restored to its initial position by spring 110 with coincident movement of latch arm 115 out of contact with pin 78a, whereupon the cam assembly may again rotate with spool 65, in the event that the latter is then being driven by the motor, until pin 78 again engages finger 117. This condition is illustrated in Figs. 5 and 6.

On the outer side of deck 31 is disposed a plurality of switches. As is shown in Figures 1, 3, 4 and 9, each of posts 120 is positioned at right angles to and is secured to deck 31 and supports two separate double throw switches each of which includes a middle leaf 121a and outer leaves 121b and 121c. The posts 120 have rounded ends which are knurled endwise. When pressed into holes in deck 31, the posts seat themselves and can not be rotated. Thus the switches are permanently positioned. Flat sheets of insulating material 123 separate these three leaves from one another and from post 120 and clamping plate 124. Each switch is connected to a post by a single screw 125 which extends through this plate 124, sheets 123 and the leaves of the switch and into the post. It is preferable to assemble the leaves, sheets, post and plate, and then to apply sufficient pressure to the post 120 and plate 124 to embed the leaves in the sheets (as by clamp shown). Then screws 125 are screwed into the posts to hold the parts in such assembled position.

Figures 4, 5, 6, 7:
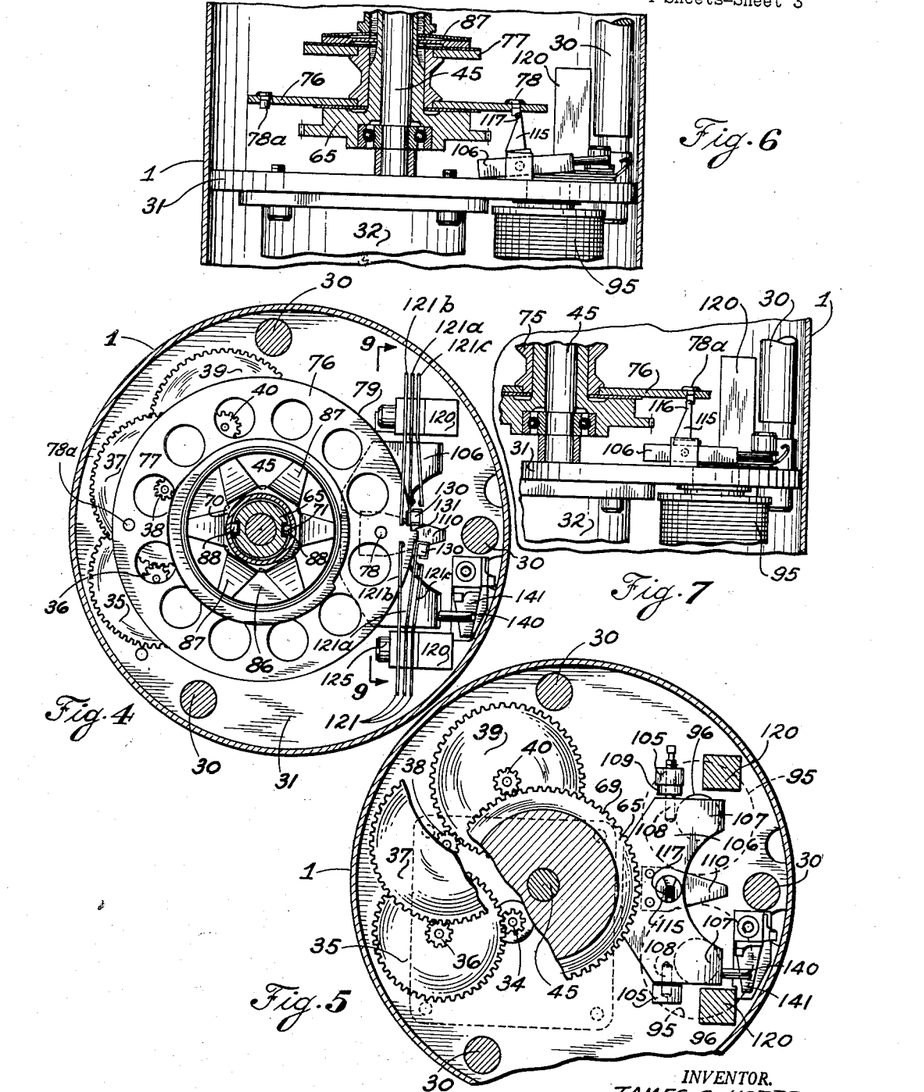
Figure 4 is a transverse view, partly in section, taken on line 4—4 of Figure 1.
Figure 5 is a transverse view, partly in section and with parts broken away, taken on line 5—5 of Figure 1.
Figures 6 and 7 are fragmentary, longitudinal views, partly in section, showing the armature and latch arm at the ends of its stroke.

As is better shown in Figure 4, the middle leaves 121a of the two switches on one post have their free ends wrapped around a connecting bar 130 which is rectangular in cross section and consists of insulating material, for example nylon, and is so positioned as to lie close to the low part of the cam edge 79 on cam disk 76 when leaves 121a are in contact with leaves 121b. When this disk is rotated, its cam edge 79 comes into contact with bar 130 and moves it laterally, thereby moving leaves 121a out of contact with leaves 121b and into contact with leaves 121c. As the cam disk 76 continues to rotate, the drop-off 131 from the high part of the cam to the low part, permits the bar 130 to return to its normal position with leaves 121a returning to their contact with leaves 121b. Figure 4 shows the position of the switch parts just after the cam has started to rotate upon removal of detaining finger 117 from pin 78, where the drop-off 131 is just above the bar 130 of the lower pair of switches and is just below the bar 130 of the upper pair of switches. There the circuits connected to leaves 121a and 121b of the upper switches are closed and the circuits connected to leaves 121a and 121c of the lower switches are closed. The circuits through leaves 121a and 121c are all closed when pin 78 engages stop finger 117. Each spring leaf has its end extended beyond its supporting post 120 to serve as a terminal for connection to a conductor.

Figure 8:
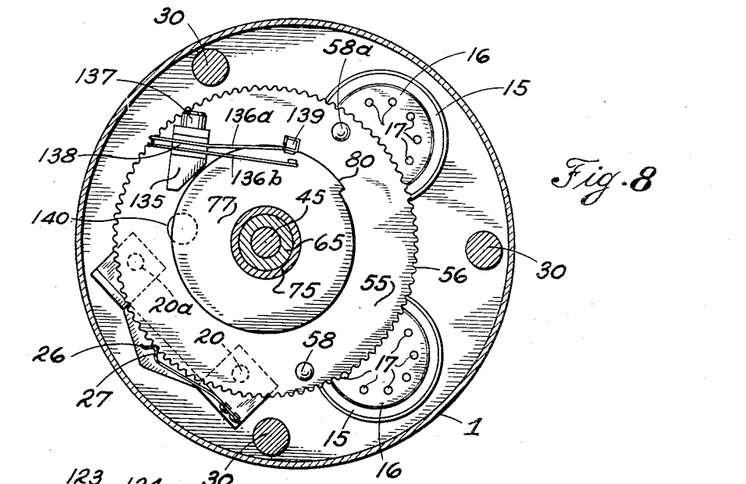
Figure 8 is a transverse view, partly in section, taken on line 8—8 of Figure 1.
Figures 9, 10:
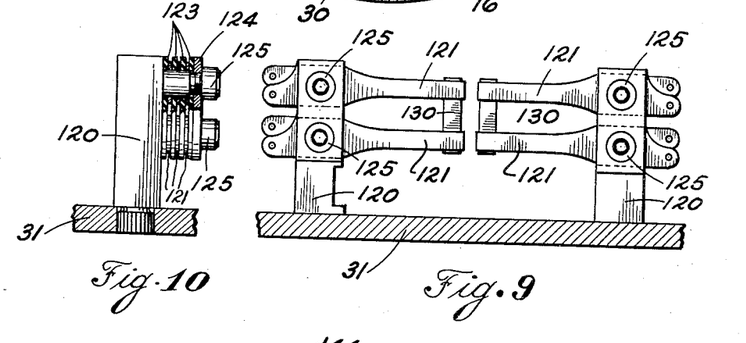
Figure 9 is a side elevational view taken on line 9—9 of Figure 4 showing the switches attached to deck 31.
Figure 10 is an end elevational view, partly in section, of one of the switches of Figure 9.

Figure 8 shows two single throw switches which are carried by a post 135 extending inwardly from disc 55 and which are generally like the switches of Figures 9 and 10. Each of these switches includes two spring leaves, 136a and 136b, secured to post 135 by screws 137 with intervening insulating plates 138, similar to corresponding parts shown in Figures 9 and 10. Leaves 136a in the two switches have their free ends wrapped around an insulating bar 139 which is similar to bar 130 of Figure 9 and this bar is engageable with the cam edge 80 of outer cam 77. When the low spot of cam 80 is adjacent to bar 139, the leaves 136a and 136b are in contact with each other, but when the cam is rotated, the cam edge comes into contact with bar 139 and moves it laterally so that the leaves 136b are moved out of contact with leaves 136a. Further rotation of the cam permits the leaves to make contact when the high part of the cam has passed out of contact with bar 139. Conductors (not shown) from the switches carried by disc 55 may be led through hole 140 in the disc, wrapped around post 45 and connected to terminals in one of the headers 16.

Figure 8 also shows two pins 58 and 58a which project outwardly from disk 55 and are engageable respectively with pins 20 and 20a which attach indicator 25 to cover 4. Since pins 58 and 58a are farther apart, circumferentially, than pins 20 and 20a, disc 55 may be rotated through a wide angular range.

Figure 11:
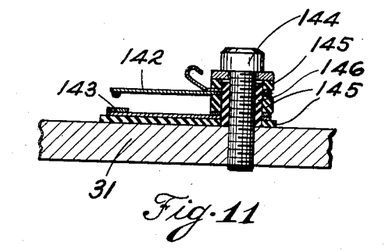
Figure 11 is a cross-sectional view of a switch actuated by the armature of the electromagnet.

Armature 106 has a rod-like extension 141 which consists of, or is covered with, insulating material and which is engageable with the flexible leaf 142 of a switch carried on the outer side of deck 31, to make and break contact with fixed leaf 143. As shown in Figure 11, the leaves 142 and 143 are insulated from each other, from deck 31 and from screw 144 by insulating plates 145 and tube 146, and screw 144 holds the several parts in assembled relation and in mounted position on deck 31.

The operation of the disclosed device will be readily apparent from the foregoing disclosure and the following brief description. With the various terminals of the motor, electromagnet and the several switches connected to the terminals 17 in the cover 4 and with these terminals, in turn, connected to sources of suitable external electrical current through conductors (not shown), some of which, for example the motor and electromagnet, have switches therein, and with the switch in the motor circuit closed, motor 32 will be energized and will rotate the cam assembly until pin 78 of cam 76 engages finger 117 of latch arm 115, whereupon rotation of the cam assembly stops. If the switch in the circuit connected to the electromagnet is closed, armature 106 will be pivoted and the latch arm will be moved out of contact with pin 78, thereby freeing the cam assembly for rotation with spool 65 until pin 78a of cam 76 comes into contact with arm 115, whereupon rotation of the cam assembly ceases. When the armature 106 is attracted by the electromagnet, extension 141 bears on leaf 142 and brings it into contact with the fixed leaf 143 of the adjacent switch.

The disk 55 may be adjusted as by inserting a screwdriver in notch 46 and rotating the post. Thus one may control the time when the switches carried by post 135 are actuated with reference to the switches carried by posts 120. For example, the disk 55 may be positioned with pin 58 engaging stop 20 or with pin 58a engaging stop 20a and it may also be shifted to any desired position between these two extremes. The extent of such adjustment is readily determinable by looking through window 12 and observing the position of the scale on disk 55 which is in line with the index line on marker 25. The dog 27 which engages with the teeth 56 of disk 55 serves to maintain disk 55 in any position to which it may have been adjusted as just described.

It will be understood that a variety of results may be obtained depending on the devices connected in the various switch-controlled circuits and that these results may be further increased by varying the adjustment of the switches carried by disk 55.

Having thus described the present invention so that others schooled in the art may be able to understand and practice the same, I state that what I desire to secure by Letters Patent is defined in what is claimed.

What is claimed is:

1. A remote controlled switching device comprising a post having a fixed longitudinal axis and being adjustably rotatable thereabout, cam means mounted for rotation around said post, means rotatable around said post at a constant speed for rotating said cam means, a switch actuatable by said cam means, means engageable with the cam means to control its rotary movement and means for actuating said cam controlling means to permit rotation of the latter.

2. A remote controlled switching device comprising a deck, a post adjustably fixed relative to and projecting from the deck at right angles thereto, cam means mounted for rotation around said post, means continuously rotatable around said post at a constant speed for rotating said cam means, a switch actuatable by said cam means, a latch means engageable with said cam means to control its rotary movement and means for moving said latch means out of engagement with said cam means to permit rotation of the latter.

3. A remote controlled switching device comprising a deck, a post adjustably fixed relative to and projecting from the deck at right angles thereto, cam means mounted for rotation around said post, means continuously rotatable around said post at a constant speed for rotating said cam means, a switch connected to the outer surface of said deck and engageable with said cam means, a latch pivotally connected to the deck and engageable with said cam means to control its rotary movement and means for pivoting said latch out of engagement with said cam means to permit rotation of the latter.

4. A remote controlled switching device comprising a deck, a post adjustably fixed relative to and projecting from the deck at right angles thereto, a spool mounted on said post, cam means mounted on said spool, a friction clutch connecting said spool and cam means, means for rotating said spool at a constant speed, a switch engageable with and actuatable by said cam means, a latch engageable with said cam means to control its rotary movement and means for moving said latch out of engagement with said cam means to permit rotation of the latter with said spool.

5. A remote controlled switching device comprising a deck, a post adjustably fixed relative to and projecting from the deck at right angles thereto, cam means mounted for rotation around said post and including a disc having a cam shaped periphery, means continuously rotatable around said post at a constant speed for rotating said cam means, a pair of switches connected to said deck, each switch including a movable leaf, a bar of insulating material connecting said movable leaves and engageable with and actuatable by said cam shaped periphery, a latch engageable with said cam means to control its rotary movement and means for moving said latch out of engagement with said cam means to permit rotation of the latter.

6. A remote controlled switching device comprising a deck, a post adjustably fixed relative to and projecting from the deck at right angles thereto, cam means mounted for rotation around said post and including a disc having a cam shaped periphery, means continuously rotatable around said post at a constant speed for rotating said cam means, two pairs of switches connected to said deck, each switch including a movable leaf, nylon bars each connecting the movable leaves of a pair of switches and engageable with and actuatable in succession by said cam shaped periphery, a latch engageable with said cam means to control its rotary movement and means for moving said latch out of engagement with said cam means to permit rotation of the latter.

7. A remote controlled switching device comprising a deck, a post adjustably fixed relative to and projecting from the deck at right angles to its outer surface, a dial disk secured to said post, cam means mounted for rotation around said post, means continuously rotatable around said post at a constant speed for rotating said cam means, a switch fixedly connected to said dial disk and engageable with and actuatable by said cam means, a latch engageable with said cam means to control its rotary movement and means for moving said latch out of engagement with said cam means to permit rotation of the latter.

8. A remote controlled switching device comprising a deck, a post adjustably fixed relative to and projecting from the deck at right angles thereto, a dial disk secured to said post, cam means mounted for rotation around said post, means continuously rotatable around said post at a constant speed for rotating said cam means, a switch fixedly connected to the outer side of said deck, a switch fixedly connected to the under side of said dial disk, said switches being engageable with and actuatable by said cam means, a latch pivotally connected to the deck and engageable with said cam means to control its rotary movement and means for pivoting said latch out of engagement with said cam means to permit rotation of the latter.

9. A remote controlled switching device comprising a deck, a post adjustably fixed relative to and projecting from the deck at right angles thereto, a spool rotatable on said post, means for rotating said spool around said post at a constant speed, a cam assembly rotatable on said spool, a friction clutch connecting said spool and said cam assembly for rotating the latter, a switch connected to said deck, said cam assembly including a disk having a cam-shaped peripheral surface disposed adjacent to and engageable with said switch for actuating the latter.

10. A remote controlled switching device comprising a post having its longitudinal axis fixed and being adjustably rotatable thereabout, a spool rotatable on said post, means for rotating said spool around the post at a constant speed, a cam disk rotatable on said spool, a friction clutch comprising a "nylon" fabric disposed between and engageable with opposed side surfaces of the cam and spool and means urging said disk and spool against said cam and spool against said fabric, and a switch fixed adjacent to said cam disk and being engageable with and actuatable thereby.

11. A remote controlled switching device comprising a deck, a post adjustably fixed relative to and projecting from said deck at right angles thereto, a dial disk secured to the post, a spool rotatable on said post, means for rotating said spool around said post continuously at a constant speed, a cam assembly rotatable on said spool, a friction clutch connecting said spool and said cam assembly for rotating the latter, switches mounted on said dial disk and on said deck, said cam assembly including axially spaced disks connected together for rotation as a unit and having cam-shaped peripheral surfaces, disposed adjacent to and engageable with said switches for actuating the latter.

12. A remote controlled switching device comprising a post having its longitudinal axis fixed and being adjustably rotatable thereabout, a dial disk secured to the post, a spool rotatable around said post, means for rotating said spool around said post at a constant speed, a cam assembly rotatable on said spool, said assembly including a hub and disks spaced axially apart and secured to the hub near its ends, said disks having cam-shaped peripheral edge surfaces, "nylon" fabric between the spool and the remote side surfaces of said disks, means urging said fabric against said side surfaces of the disks, and switches fixedly disposed adjacent to and engageable with the peripheral edge surfaces of said cams for actuation thereby.

13. A remote controlled switching device comprising a deck, a post adjustably fixed relative to and projecting from the deck at right angles thereto, cam means mounted for rotation around said post, a constant speed motor carried by said deck for rotating said cam means, a separate switch carried by the deck and actuatable by said cam means, a latch pivotally connected to said deck and engageable with said cam means to control its rotary movement and an electromagnet carried by said deck for pivoting said latch out of engagement with said cam disk to permit rotation of the latter.

14. A remote controlled switching device comprising a deck, a post adjustably fixed relative to and projecting from the deck at right angles thereto, cam means mounted for rotation around said post, a constant speed motor carried by said deck for rotating said cam means, a switch fixedly carried by the deck and actuatable by said cam means, an armature pivotally carried by said deck, a latch carried by said armature, and engageable with said cam means to control its rotary movement, and an electromagnet carried by said deck for pivoting said armature and moving said latch out of engagement with said cam means to permit rotation of the latter.

15. A remote controlled switching device comprising a cylindrical sheet metal container, a disk-like deck within the container, and partly supported therein by deformation of the side wall of the container, a post projecting from the deck at right angles thereto, a spool rotatable on said post, means for rotating said spool continuously around said post at a constant speed, a cam assembly rotatable on said spool and including a disk having a cam-shaped peripheral surface, a friction clutch connecting said spool and said cam assembly for rotating the latter, and a switch supported by said deck and actuatable by said cam disk.

16. A remote controlled switching device comprising a cylindrical sheet metal container, a disk-like deck within the container and partly supported therein by deformation of the side wall of the container, a post projecting from the deck at right angles thereto, a spool rotatable on said post, means for rotating said spool around said post continuously at a constant speed, a cam assembly rotatable on said spool and including a disk having a cam-shaped peripheral surface, a friction clutch connecting said spool and said cam assembly for rotating the latter, and separate switches supported by said deck and separately actuatable by said cam disk 17. A remote controlled switching device comprising a cylindrical sheet metal container, a disk-like deck within the container and partly supported therein by deformation of the side wall of the container, a manually rotatable post projecting from the deck at right angles thereto, a spool rotatable on said post, means for rotating said spool continuously around said post at a constant speed, a dial disk secured to said post, a cam assembly rotatable on said spool and including axially spaced disks adjacent to said deck and dial disk respectively and having cam-shaped peripheral surfaces, a friction clutch connecting said spool and said cam assembly for rotating the latter, and separate switches supported by said dial disk and deck and separately actuatable by the respective adjacent cam disk.

18. A remote controlled switching device comprising a deck, a constant speed motor attached to the inner side of said deck with its rotor shaft extending through the latter, an electromagnet attached to the inner side of said deck with its pole pieces extending through the latter, a post projecting at right angles from the outer side of said deck, a spool rotatably mounted on said post, a train of gears connecting the rotor shaft of the motor with said spool, axially spaced connected cams rotatable on said spool, friction clutch means connecting said spool with said cams for rotation of the latter, an armature pivotally mounted on the outer side of said deck adjacent to the ends of said poles, and actuatable by said electromagnet, a latch arm projecting from said armature, pins carried by the adjacent cam to engage said latch in its various positions, a pair of switches each including a movable middle leaf and leaves on each side thereof, an insulating bar secured to the middle leaves of said switches and engageable with the adjacent cam for movement of the middle leaves out of contact with the leaves on one side thereof and into contact with the leaves on the other side thereof.

19. A remote controlled switching device comprising a deck, a constant speed motor attached to the inner side of said deck with its rotor shaft extending through the latter, an electromagnet attached to the inner side of said deck with its pole pieces extending through the latter, a manually rotatable post adjustably fixed relative to and projecting at right angles from the outer side of said deck, a dial disk secured to said post, a spool rotatably mounted on said post, a train of gears connecting the rotor shaft of the motor with said spool, axially spaced connected cams rotatable on said spool, friction clutch means connecting said spool with said cams for rotation of the latter, an armature pivotally mounted on the outer side of said deck adjacent to the ends of said poles and actuatable by said electromagnet, a latch arm projecting from said armature, pins carried by the adjacent cam to engage said latch in its various positions, a pair of switches carried respectively by said deck and said dial disk, each of said switches a movable leaf and a leaf on one side thereof, insulating bars secured to the movable leaves of each pair of switches and engageable respectively with the adjacent cam for movement of the movable leaves out of contact with the leaves on one side thereof, and into contact with the leaves on the other side thereof.

20. A remote controlled switching device comprising a cylindrical container having an open end, a cover closing said open end, a dsik-like deck within the container, a plurality of circumferentially spaced posts secured at their ends to said deck and cover and fixing them in spaced position, said deck being partly supported by deformation of the cylindrical wall of the container into engagement therewith, a manually rotatable post adjustably fixed relative to and projecting from said deck through said cover, spring means urging said post toward said deck, a dial disk secured to said post between said deck and cover, a constant speed motor carried on the inner side of said deck with its rotor shaft projecting therethrough, an electromagnet carried on the inner side of said deck with its poles projecting therethrough, cam means rotatable around said post between said deck and cover, means connecting said rotor shaft with said cam means for transmtting rotary motion from the one to the other, switches carried by said dial disk and by said deck adjacent to said cam means and actuatable thereby, an armature pivotally supported by said deck within the field of said poles for pivotal movement by said electromagnet, and latch means carried by said armature and engageable with said cam means for controlling rotation of the latter.

21. A remote controlled device comprising a metal container having an open end defined by a conical wall, a closure for said open end having a disk-like body, a conical outwardly extending peripheral flange to seat on said conical wall and a plurality of outwardly extending open-ended projections, a conductor carring plug soldered in one of said projections, a glass window soldered in another of said projections, a manually rotatable post extending out through still another of said projections, sealing means within the latter depression around said post, a film of solder sealing the space between and connecting the said conical wall and the said conical flange, a deck within said container connected in spaced relation to said closure, said post extending into said deck, switch means carried by said deck, and means for actuating said switch means including a constant speed motor carried by said deck and connected for energization to conductors in said plug.

22. A remote controlled switching device comprising a cup shaped container having one end open, a cover for said opening, a window in said cover, a disk-like deck within the container and supported by deformation of the side wall of the container, circumferentially spaced posts connecting said cover and deck in spaced position, a constant speed motor attached to the deck on its inner side and having its rotor shaft projecting through the deck, a manually rotatable post projecting from the deck at right angles to the outer side thereof, and extending through said cover, a spool rotatably mounted on said post, a train of gears mounted on the outer side of said deck and connecting said rotor shaft with said spool for transmission of rotary motion, a cam assembly including a hub rotatable on said spool and inner and outer cams fixed to said hub, a clutch plate keyed to the spool on the outer side of said outer cam, nylon clutch liners between said spool and said inner cam and between said outer cam and said clutch plate, spring means on the spool and bearing against the outer side of said clutch plate and a nut on said spool for adjusting the pressure exerted by said spring on said clutch plate, an indicator secured to the inner side of said cover adjacent to said window, a dial disk fixed to said post adjacent to said cover, having a scale thereon viewable through said window and having a notched periphery, stops projecting from the cover toward said dial disk, pins on said dial disk engageable with said stops to limit rotation of the latter, a dog engageable with the notched periphery of said dial, an electromagnet secured to the inner side of said deck and having pole pieces projecting through the deck, an armature pirvotally mounted on the outer side of said deck adjacent to said pole pieces for pivotal movement to one end of its stroke when the electromagnet is energized, spring means between the armature and deck for urging said armature to the other end of its stroke when the electromagnet is deenergized, a latch arm projecting from said armature pins projecting from the inner side of said inner cam and engageable respectively with said latch when at opposite ends of its stroke, said latch serving to control rotation of the cam assembly when said spool is rotated, switch carrying posts projecting from the outer side of said deck, a pair of switches carried by each post, each switch including a spring leaf and leaves on each side thereof, insulator bars fixed to the free ends of the spring leaves of each pair of switches and engageable with the inner cam for opening and closing the switches, a pair of switches secured to the inner said dial disk, each such switch including a spring leaf and a leaf on one side thereof, an insulator bar connecting the unsupported ends of said spring leaves and engageable with the outer cam for opening and closing said switches, and current conductors leading from said motor and said electromagnet through said cover.

23. A metal, fluid-pressure-retaining container having an open end, a metal cover for said open end having a body portion and a tubular portion projecting from said body portion, said tubular portion having an end wall remote from said body portion and provided with an opening of reduced diameter, a member projecting out through said opening, a plurality of O-rings around said member within said tubular projection and means engaging one of said rings and serving to press said rings into fluid tight sealing engagement with the outer surface of said member and the inner surface of said tubular projection.

24. A metal, fluid-pressure-retaining container having an open end, a metal cover for said open end having a body portion and a tubular portion projecting from said body portion, said tubular portion having an end wall remote from said body portion and provided with an opening of reduced diameter, a member projecting out through said opening, resilient packing having fluid tight sealing engagement with the outer surface of the said member and the inner surface of said tubular projection, and spring means around said member and urging said packing outwardly in said tubular projection.

25. A metal, fluid-pressure-retaining container having an open end, a metal cover for said open end having a body portion and a tubular portion projecting from said body portion, said tubular portion having an end wall remote from said body portion and provided with an opening of reduced diameter, a member projecting out through said opening and having a shoulder opposed to said end wall, resilient packing having fluid tight sealing engagement with the outer surface of the said member and the inner surface of said tubular projection, and spring means compressed between said shoulder and said packing and urging them in opposite directions.

26. A clutch, suitable for use in a remote controlled switching device, comprising a rotatable member having a portion provided with an annular driving surface, a member surrounding said rotatable member and having an annular driven surface substantially parallel to said driving surface, a resilient clutch disc between and engaging said driven and said driving surfaces, and adjustable means connected to said rotatable member to press the said driven and said driving surfaces against said disc.

27. A clutch, suitable for use in a remote controlled switching device, comprising a rotatable member having a portion provided with an annular driving surface, a member surrounding said rotatable member and having an annular driven surface substantially parallel to said driving surface, a resilient clutch disc between and engaging said driven and said driving surfaces, said disc comprising a fabric composed of resilient fibers, and adjustable means connected to said rotatable member to press the said driven and said driving surfaces against said disc.

28. A clutch, suitable for use in a remote controlled switching device, comprising a rotatable member having means provided with opposed annular driving surfaces, a member surrounding said rotatable member and having means provided with annular driven surfaces substantially parallel to and disposed opposite to said driving surface, resilient clutch discs between and engaging said driven and said driving surfaces, said disc comprising a woven fabric composed of fibers of a synthetic, polymeric resin with the ends of the fibers thereof fused together at the edge of the disc, and adjustable means connected to said rotatable member to press the said driven and said driving surfaces against said disc.

References Cited in the file of this patent

UNITED STATES PATENTS

| | | |
|---|---|---|
| 1,194,386 | Horton | Aug. 15, 1916 |
| 1,595,831 | Gans | Aug. 10, 1926 |
| 1,676,433 | Evers | July 10, 1928 |
| 1,829,037 | Bobroff | Oct. 27, 1931 |
| 1,858,464 | Schaumberger | May 17, 1932 |
| 2,142,462 | Teeple | Jan. 3, 1939 |
| 2,150,379 | Kerschbaum | Mar. 14, 1939 |
| 2,180,948 | Bassett | Nov. 21, 1939 |
| 2,203,556 | Warren | June 4, 1940 |
| 2,313,064 | Hall | Mar. 9, 1943 |
| 2,444,955 | Ringer | July 13, 1948 |
| 2,455,704 | Schultz | Dec. 7, 1948 |
| 2,529,032 | Lindell | Nov. 7, 1950 |
| 2,629,475 | Hooker | Feb. 24, 1953 |
| 2,648,305 | Appleman | Aug. 11, 1953 |
| 2,670,039 | Burkholder | Feb. 23, 1954 |

UNITED STATES PATENT OFFICE

CERTIFICATE OF CORRECTION

Patent No. 2,872,545                                  February 3, 1959

James C. Hobbs

It is hereby certified that error appears in the above numbered patent requiring correction and that the said Letters Patent should read as corrected below.

In the grant, lines 13 and 14, for "United States of America as represented by the United States Atomic Energy Commission" read -- James C. Hobbs, his heirs or assigns, and the United States of America as represented by the United States Atomic Energy Commission --; in the printed specification, column 10, line 63, for "pirvotally" read -- pivotally --.

Signed and sealed this 14th day of July 1959.

(SEAL)
Attest:

KARL H. AXLINE                                          ROBERT C. WATSON
Attesting Officer                                      Commissioner of Patents